(12) United States Patent
Tan et al.

(10) Patent No.: US 10,979,469 B2
(45) Date of Patent: Apr. 13, 2021

(54) AUDIO DATA PROCESSING METHOD AND APPARATUS

(71) Applicant: Huawei Technologies Co., Ltd., Shenzhen (CN)

(72) Inventors: Liwen Tan, Beijing (CN); Yulong Li, Shenzhen (CN); Wei Sun, Beijing (CN); Haiheng Cao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 104 days.

(21) Appl. No.: 16/474,836

(22) PCT Filed: May 27, 2017

(86) PCT No.: PCT/CN2017/086238
§ 371 (c)(1),
(2) Date: Jun. 28, 2019

(87) PCT Pub. No.: WO2018/120627
PCT Pub. Date: Jul. 5, 2018

(65) Prior Publication Data
US 2019/0327284 A1 Oct. 24, 2019

(30) Foreign Application Priority Data

Dec. 30, 2016 (CN) .......................... 201611259388.2

(51) Int. Cl.
*H04L 29/06* (2006.01)
*G10L 21/0208* (2013.01)
(Continued)

(52) U.S. Cl.
CPC ........ *H04L 65/601* (2013.01); *G10L 21/0208* (2013.01); *H04L 65/80* (2013.01);
(Continued)

(58) Field of Classification Search
None
See application file for complete search history.

(56) References Cited

U.S. PATENT DOCUMENTS

2010/0248794 A1 9/2010 Huang et al.
2012/0170772 A1 7/2012 Zheng
(Continued)

FOREIGN PATENT DOCUMENTS

CN 1992535 A 7/2007
CN 101848280 A 9/2010
(Continued)

OTHER PUBLICATIONS

Machine Translation and Abstract of Chinese Publication No. CN1992535, Jul. 4, 2007, 8 pages.
(Continued)

Primary Examiner — Stella L. Woo
(74) Attorney, Agent, or Firm — Conley Rose, P.C.

(57) ABSTRACT

An audio data processing method comprises receiving at least one audio signal frame from an audio playing program, obtaining a first average power of the at least on audio signal frame, determining whether the first average power of the at least one audio signal frame is less than a first threshold and whether the audio playing program is in a background running mode, and in response to determining that the first average power of the at least one audio signal frame is less than the first threshold and the audio playing program is in the background running mode, triggering the audio playing program to pause playing.

20 Claims, 4 Drawing Sheets

(51) Int. Cl.
  *H04R 3/04* (2006.01)
  *H04N 21/439* (2011.01)
  *H04R 3/00* (2006.01)
(52) U.S. Cl.
  CPC ........... *H04N 21/439* (2013.01); *H04R 3/007* (2013.01); *H04R 3/04* (2013.01); *H04R 2499/11* (2013.01)

(56) References Cited

U.S. PATENT DOCUMENTS

| | | | |
|---|---|---|---|
| 2015/0331658 A1 | 11/2015 | Domingo Yaguez | |
| 2016/0360019 A1* | 12/2016 | Ellis | H04M 1/6091 |
| 2017/0053129 A1* | 2/2017 | Arif | H04M 1/72583 |

FOREIGN PATENT DOCUMENTS

| | | | |
|---|---|---|---|
| CN | 102098606 | A | 6/2011 |
| CN | 105404654 | A | 3/2016 |
| CN | 105429984 | A | 3/2016 |
| CN | 105704609 | A | 6/2016 |
| KR | 100820905 | B1 | 4/2008 |

OTHER PUBLICATIONS

Machine Translation and Abstract of Chinese Publication No. CN105429984, Mar. 23, 2016, 19 pages.

Machine Translation and Abstract of Chinese Publication No. CN105404654, Mar. 16, 2016, 13 pages.

Machine Translation and Abstract of Chinese Publication No. CN105704609, Jun. 22, 2016, 14 pages.

Machine Translation and Abstract of Korean Publication No. KR100820905, Apr. 11, 2008, 20 pages.

Foreign Communication From a Counterpart Application, Chinese Application No. 201780009194.3, Chinese Office Action dated Jul. 26, 2019, 7 pages.

Foreign Communication From a Counterpart Application, PCT Application No. PCT/CN2017/086238, English Translation of International Search Report dated Aug. 25, 2017, 2 pages.

Foreign Communication From a Counterpart Application, PCT Application No. PCT/CN2017/086238, English Translation of Written Opinion dated Aug. 25, 2017, 3 pages.

* cited by examiner

AUDIO DATA PROCESSING METHOD AND APPARATUS

CROSS-REFERENCE TO RELATED APPLICATIONS

This application is a U.S. National Stage of International Patent Application No. PCT/CN2017/086238 filed on May 27, 2017, which claims priority to Chinese Patent Application No. 201611259388.2 filed on Dec. 30, 2016, both of which are hereby incorporated by reference in their entireties.

TECHNICAL FIELD

This application relates to multimedia technologies, and in particular, to an audio data processing method and apparatus.

BACKGROUND

User equipment usually plays audio in two modes. One mode is a normal mode. In this mode, an audio soft-decision decoder performs decoding on a central processing unit (Central Processing Unit, CPU) side, and then an audio mixer (Audio Mixer) mixes a plurality of audio tracks for playing. The other mode is an offload mode. In this mode, a DSP decoder performs decoding on a digital signal processing (Digital Signal Processing. DSP) side, and then processing such as audio mixing is performed for playing.

In a processing manner of the offload mode, power consumption is usually relatively low, but in a processing manner of the normal mode, power consumption is usually relatively high. Therefore, power consumption needs to be reduced in the processing manner of the normal mode.

SUMMARY

Embodiments of this application provide an audio data processing method and apparatus, to reduce power consumption in a mute playing scenario when user equipment uses a processing manner of a normal mode.

According to a first aspect, an embodiment of this application provides an audio data processing method, including:

receiving at least one decoded audio signal frame, and obtaining average power of the at least one audio signal frame; and determining whether a deactive playing condition is satisfied, and if the deactive playing condition is satisfied, triggering an audio playing program to pause playing, where the deactive playing condition includes: the average power of the at least one audio signal frame is less than a first preset threshold, and the audio playing program is in a background running mode.

This implementation can effectively recognize mute playing, and perform corresponding processing on an audio playing program, to effectively reduce power consumption when a processing manner of a normal mode is used.

With reference to the first aspect, in a possible implementation of the first aspect, the at least one audio signal frame includes M audio signal frames, and the obtaining average power of the at least one audio signal frame includes: obtaining average power of each audio signal frame, where the deactive playing condition includes: a ratio of audio signal frames that are of the M audio signal frames and whose average power is less than the first preset threshold to the M audio signal frames exceeds a second preset threshold, and the audio playing program is in the background running mode; and M is any positive integer greater than 1.

This implementation can effectively recognize mute playing, and perform corresponding processing on an audio playing program, to effectively reduce power consumption when a processing manner of a normal mode is used. In addition, whether the deactive playing condition is satisfied is determined based on average power of the M audio signal frames, to further improve recognition accuracy of a mute playing scenario.

With reference to the first aspect or the possible implementation of the first aspect, in another possible implementation of the first aspect, the receiving at least one decoded audio signal frame includes: receiving the at least one decoded audio signal frame at preset intervals; and the method further includes:

if the deactive playing condition is satisfied continuously for a plurality of times, increasing a time length of the preset interval.

In this implementation, an updated audio signal frame is obtained in time at preset intervals, it is determined whether the updated audio signal frame satisfies the deactive playing condition, and a processing manner of the audio playing program is dynamically adjusted based on a determining result.

With reference to the first aspect or any possible implementation of the first aspect, in another possible implementation of the first aspect, the method further includes: if the deactive playing condition is not satisfied, triggering the audio playing program to play the audio signal frame.

With reference to the first aspect or any possible implementation of the first aspect, in another possible implementation of the first aspect, the obtaining average power of each audio signal frame includes:

obtaining sampling values x of a plurality of sampling signals of each audio signal frame; and calculating average power $p_x(m)$ of each audio signal frame based on a formula $$p_x(m) = \frac{1}{S_0} \sum_{i=0}^{S_0-1} x(mS_0 + i)^2,$$

where m is a number of the audio signal frame, and $S_0$ is a quantity of sampling points of the audio signal frame.

With reference to the first aspect or any possible implementation of the first aspect, in another possible implementation of the first aspect, the method further includes:

if the audio playing program switches from pausing playing to playing, performing smoothing processing on the audio signal frame, to obtain an output signal after the smoothing; and controlling the audio playing program to play the output signal obtained after the smoothing.

In this implementation, when pausing playing is switched to playing, smoothing processing is performed, to effectively improve audio experience.

According to a second aspect, an embodiment of this application provides an audio data processing apparatus. The audio data processing apparatus has a function of implementing an action of an audio data processing apparatus in the foregoing method embodiment. The function may be implemented by using hardware, or may be implemented by hardware executing corresponding software. The hardware or software includes one or more modules corresponding to the foregoing function.

According to a third aspect, an embodiment of this application provides user equipment, including: a processor, a memory, a communications bus, and a communications interface. The memory is configured to store a computer executable instruction. The processor is connected to the memory by using the communications bus. When the user equipment runs, the processor executes the computer executable instruction stored by the memory, so that the user equipment performs the audio data processing method according to any implementation of the first aspect.

According to a fourth aspect, an embodiment of this application provides a computer readable storage medium, configured to store a computer software instruction used by the foregoing user equipment. When the computer software instruction runs on a computer, the computer is caused to be able to perform the audio data processing method according to any implementation of the first aspect or any implementation of the second aspect.

According to a fifth aspect, an embodiment of this application provides a computer program product including an instruction. When the computer program product runs on a computer, the computer is caused to be able to perform the audio data processing method according to any implementation of the first aspect.

In the audio data processing method and apparatus in the embodiments of this application, the at least one decoded audio signal frame is received, the average power of the at least one audio signal frame is obtained, it is determined whether the deactive playing condition is satisfied, and if the deactive playing condition is satisfied, the audio playing program is triggered to enter a deactive playing state, where in the deactive playing state, the audio playing program pauses playing. Therefore, mute playing is effectively recognized, and corresponding processing is performed on an audio playing program, to effectively reduce power consumption when a processing manner of a normal mode is used.

BRIEF DESCRIPTION OF DRAWINGS

To describe the technical solutions in the embodiments of this application or in the prior art more clearly, the following briefly describes the accompanying drawings required for describing the embodiments or the prior art.

DESCRIPTION OF EMBODIMENTS

To make the objectives, technical solutions, and advantages of the embodiments of the present invention more comprehensible, the following clearly and completely describes the technical solutions in the embodiments of the present invention with reference to the accompanying drawings in the embodiments of the present invention.

User equipment (User Equipment, UE) described in this specification may indicate any suitable end user equipment, and may include (or may indicate) a device such as a wireless transmit/receive unit (Wireless Transmit/Receive Unit, WTRU), a mobile station, a mobile node, a mobile device, a fixed or mobile subscription unit, a pager, a mobile phone, a personal digital assistant (Personal Digital Assistant. PDA), a smartphone, a notebook computer, a computer, a touchscreen device, a wireless sensor, or a consumer electronic device. The "mobile" station/node/device herein indicates a station/node/device connected to a wireless (or mobile) network, and is not necessarily related to actual mobility of the station/node/device.

"A plurality of" in this specification means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

"Mute playing" described in this specification specifically refers to that user equipment plays an audio signal frame with low audio energy for a particular period or all the time. The period may be flexibly set based on a requirement, for example, 10 min, 30 min, or 1 h. "Low audio energy" specifically refers to that energy of an audio signal frame is less than a preset threshold, and for specific descriptions of the preset threshold, refer to the following embodiment.

To clearly understand that the audio data processing method in the embodiments of this application is applicable to user equipment, an example of an application scenario of the audio data processing method in the embodiments of this application is described. Specifically, as shown in the following FIG. 1, the audio data processing method in the embodiments of this application is also applicable to other implementable application scenarios.

Figure 1:
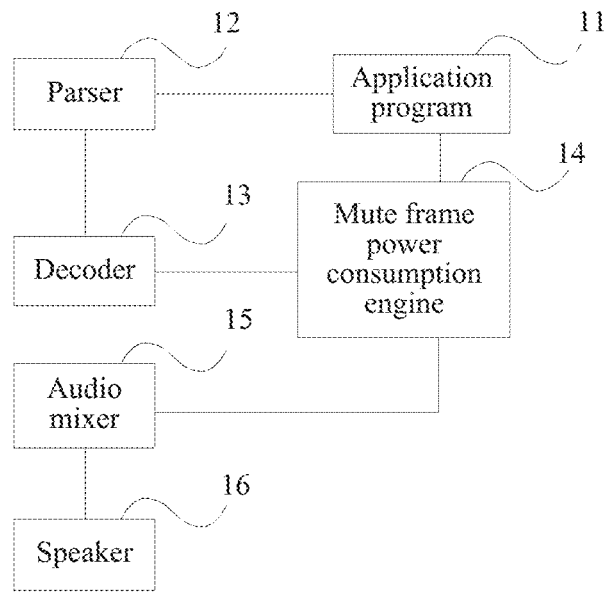
FIG. 1 is a schematic diagram of an application scenario of an audio data processing method according to an embodiment of this application.

FIG. 1 is a schematic diagram of an application scenario of an audio data processing method according to an embodiment of this application. As shown in FIG. 1, the application scenario may specifically include: an application program 11, a parser 12, a decoder 13, a SID frame power consumption engine 14, an audio mixer 15, and a speaker 16. The application program 11 may be specifically a media playing application program, a game application program, or an application program of another functional type. The parser 12 may be specifically configured to receive an audio file sent by the application program 11. The audio file may be specifically in an MP3 format, an OGG (oggVorbis) format, an advanced audio coding (Advanced Audio Coding, AAC) format, or the like. The decoder 13 (decoder) is configured to decode the audio file to obtain an audio signal flow. The audio signal flow may be specifically a pulse code modulation (Pulse Code Modulation, PCM) data stream. The SID frame power consumption engine 14 is configured to perform the audio data processing method in the embodiments of this application, recognize that an audio playing program runs in the background and is in a mute playing scenario, and perform corresponding processing on the audio playing program, to reduce power consumption when a processing manner of a normal mode is used. The audio mixer 15 is configured to mix inputted audio signals for output. The speaker 16 converts the audio signal outputted by the audio mixer 15 to a sound signal.

A layer structure of an Android (Android) system is used as an example. The structure includes a kernel (kernel) layer, a framework (application framework) layer, an application (applications) layer, and the like. It may be understood that an advantage of layering is that a unified service is provided to an upper layer by using content provided by a lower layer, differences of a current layer and a lower layer are shielded, and an upper layer is not affected when the current layer and the lower layer change. In other words, each layer is responsible for a duty of the layer, and each layer provides a fixed service access point SAP (Service Access Point). The application program 11 is located at the application (applications) layer. The SID frame power consumption engine 14 is located between the application layer and a hardware drive (kernel) layer. For example, the SID frame power consumption engine 14 may be specifically located at a libraries layer, or certainly may be located at another layer. Specifics are related to a system layer structure.

Specifically, an audio playing program may be provided in the application program 11, that is, the audio playing program may be a sub-function of the application program 11, and is configured to process an audio file. The audio playing program may send the audio file to the parser 12. The parser 12 and the decoder 13 decode the audio file to obtain an audio signal flow, where the audio signal flow may be specifically a pulse code modulation (Pulse Code Modulation, PCM) data stream. The audio playing program may further autonomously decode the audio file to obtain an audio signal flow. The SID frame power consumption reduction engine 14 receives the audio signal flow from the audio playing program, and processes the audio signal flow, so that in a scenario in which the audio playing program runs in the background and plays audio with relatively low audio energy for a long time or all the time, power consumption is reduced when a processing manner of a normal mode is used. For a specific implementation thereof, refer to descriptions in the following embodiments.

The audio signal flow or the PCM data stream described in this specification specifically includes a plurality of PCM signals. The audio signal frame described in this specification specifically refers to a PCM signal per unit time. The unit time may be 1 ms, 10 ms, 20 ms, or the like, and may be flexibly set based on a requirement. A quantity of PCM signals per unit time is related to a sampling rate, and a higher sampling rate indicates more PCM signals per unit time. The PCM signal may also be referred to as a sampling signal.

Figure 2:
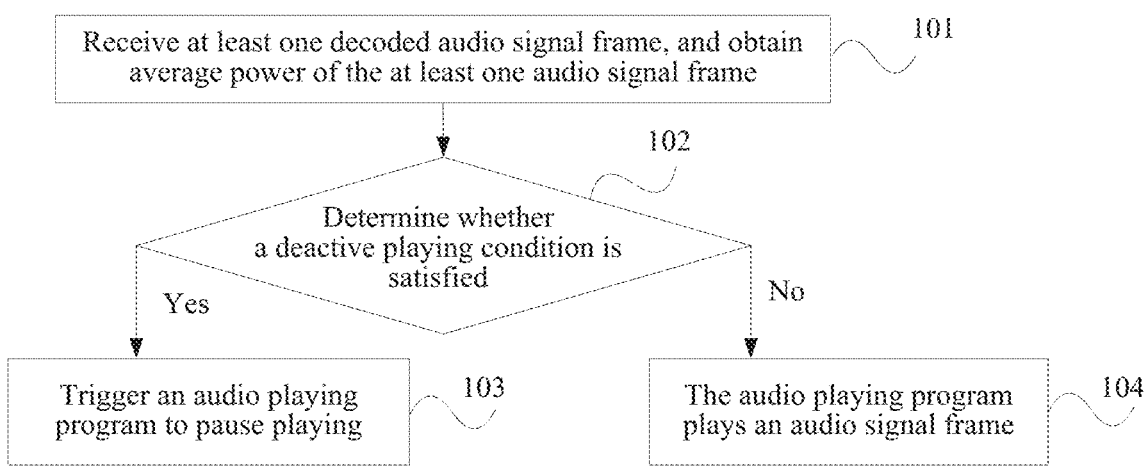
FIG. 2 is a flowchart of an audio data processing method according to an embodiment of this application.

FIG. 2 is a flowchart of an audio data processing method according to an embodiment of this application. As shown in FIG. 2, the method in this embodiment may include the following steps:

Step 101: Receive at least one decoded audio signal frame, and obtain average power of the at least one audio signal frame.

The decoded audio signal frame may be a decoded audio signal frame obtained by the decoder 13 by decoding an audio signal frame of an audio playing program, or may be a decoded audio signal frame obtained by the audio playing program by decoding.

Specifically, the SID frame power consumption engine 14 receives one or more decoded audio signal frames. The SID frame power consumption engine 14 obtains average power of the received one or more audio signal frames. There are many specific implementations for obtaining the average power of the audio signal frame, and an implementation may be flexibly selected based on a requirement. For example, an energy value of a sampling signal of the audio signal frame may be obtained, and the average power of the audio signal frame may be determined based on the energy value.

Step 102. Determine whether a deactive playing condition is satisfied; and if yes, perform step 103; or if no, perform step 104.

The deactive playing condition includes: the average power of the at least one audio signal frame is less than a first preset threshold, and the audio playing program is in a background running mode. To be specific, when the average power of the one or more audio signal frames are less than the first preset threshold, it may be determined that the one or more audio signal frames are mute audio signal frames. If the audio playing program is in the background running mode, the audio playing program may be triggered to enter a deactive playing state.

Step 103. If the deactive playing condition is satisfied, trigger an audio playing program to pause playing.

Specifically, when the deactive playing condition is satisfied, the SID frame power consumption engine 14 triggers the audio playing program to enter the deactive playing state. In the deactive playing state, the audio playing program pauses playing. The audio playing program may pause playing in the following implementation: (1) In a pull mode, an audio subsystem is suspended from requesting an audio signal frame from the audio playing program; and (2) in a push mode, the audio playing program is prevented from pushing an audio signal frame to the audio subsystem.

The audio subsystem specifically includes a parser, a decoder, a soft-decision decoder, and an audio mixer. In other words, in the deactive playing state, various audio processing activities of the audio subsystem are all in a stopping state. After the audio playing program pauses playing, network access activities related to audio, for example, the audio playing program requests data from a server in a network, also stop, thereby effectively reducing power consumption.

Step 104: If the deactive playing condition is not satisfied, the audio playing program plays an audio signal frame.

Specifically, if the deactive playing condition is not satisfied, a current playing state of the audio playing program may be obtained. If the current playing state is deactive playing, the audio playing program may be triggered to remove the deactive playing state. When the deactive playing state is removed, the audio playing program plays an audio signal frame of a corresponding time point. If the current playing state is active playing, the audio playing program is not processed, so that the audio playing program normally plays an audio signal frame of a corresponding time point.

In this embodiment, the at least one decoded audio signal frame from the audio playing program is received, the average power of the at least one audio signal frame is obtained, it is determined whether the deactive playing condition is satisfied, and if the deactive playing condition is satisfied, the audio playing program is triggered to enter a deactive playing state, where in the deactive playing state, the audio playing program pauses playing. Therefore, mute playing is effectively recognized, and corresponding processing is performed on an audio playing program, to effectively reduce power consumption when a processing manner of a normal mode is used.

The technical solution in the method embodiment shown in FIG. 2 is described in detail below by using several specific embodiments.

Figure 3:
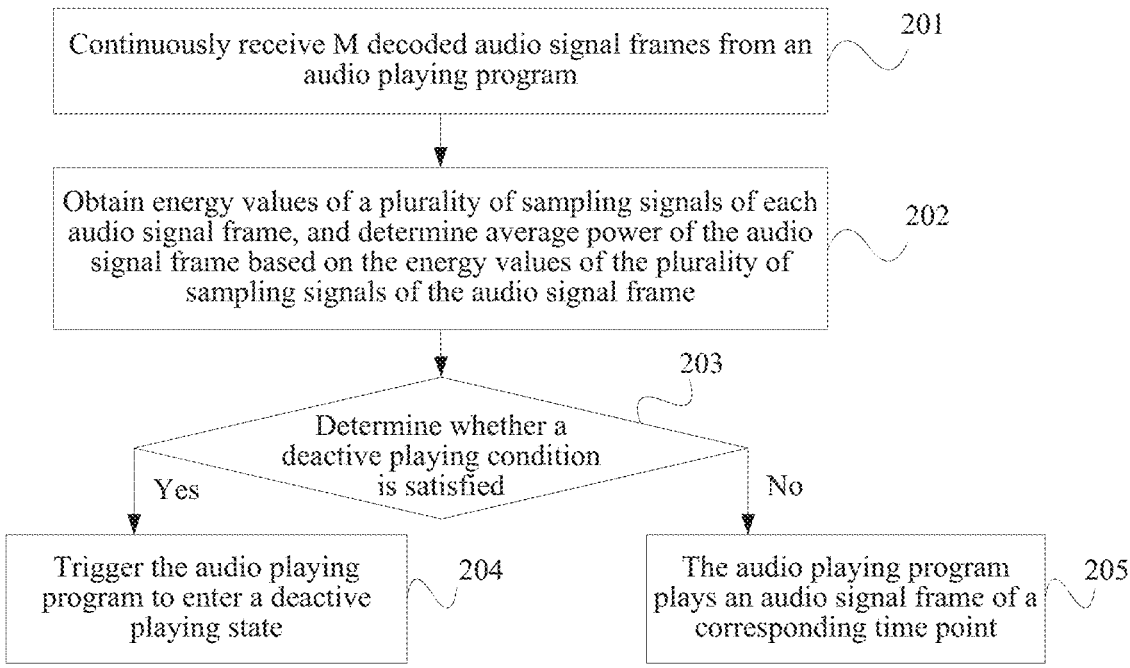
FIG. 3 is a flowchart of another audio data processing method according to an embodiment of this application.

FIG. 3 is a flowchart of another audio data processing method according to an embodiment of this application. As shown in FIG. 3, in this embodiment, energy of a plurality of audio signal frames is continuously calculated, and it is determined, based on average power of the plurality of continuous audio signal frames, whether to trigger an audio playing program to enter a deactive playing state. Therefore, this can further improve recognition accuracy of a mute playing scenario. The method in this embodiment may include the following steps.

Step 201: Continuously receive M decoded audio signal frames from an audio playing program.

M is any positive integer greater than 1, and a specific value may be flexibly set based on a requirement.

Specifically, the SID frame power consumption engine 14 continuously receives the M decoded audio signal frames from the audio playing program.

Step 202: Obtain energy values of a plurality of sampling signals of each audio signal frame, and determine average power of the audio signal frame based on the energy values of the plurality of sampling signals of the audio signal frame.

Specifically, the SID frame power consumption engine 14 calculates the average power of each audio signal frame.

Step 203. Determine whether a deactive playing condition is satisfied; and if yes, perform step 204; or if no, perform step 205.

The deactive playing condition includes: a ratio of audio signal frames that are of the M audio signal frames and whose average power is less than the first preset threshold to the M audio signal frames exceeds a second preset threshold, and the audio playing program is in a background running mode. To be specific, the deactive playing condition in this embodiment requires that the ratio of the audio signal frames that are of the M audio signal frames and whose average power is less than the first preset threshold to the M audio signal frames exceeds the second preset threshold.

Step 204: If the deactive playing condition is satisfied, trigger the audio playing program to enter a deactive playing state, where in the deactive playing state, the audio playing program pauses playing.

Step 205: If the deactive playing condition is not satisfied, the audio playing program plays an audio signal frame of a corresponding time point.

For specific descriptions of step 204 and step 205, refer to step 103 and step 104 in the embodiment shown in FIG. 2, and details are not described herein again.

Optionally, a specific implementation of step 202 is as follows: obtaining sampling values x of the plurality of sampling signals of each audio signal frame, and calculating the average power $p_x(m)$ of each audio signal frame based on a formula (1).

$$p_x(m) = \frac{1}{S_0} \sum_{i=0}^{S_0-1} x(mS_0 + i)^2, \quad (1)$$

m is a number of the audio signal frame, and $S_0$ is a quantity of sampling points of the audio signal frame.

Before step 203, the ratio of the audio signal frames that are of the M audio signal frames and whose average power is less than the first preset threshold to the M audio signal frames may be further obtained. A specific obtaining manner may be calculating the ratio based on a formula (2):

$$\gamma = C_{je}(m)/M * 100\% \quad (2), \text{where}$$

$C_{je}(m)$ is a quantity of the audio signal frames whose average power is less than the first preset threshold, $\gamma$ is the ratio, and if $\gamma$ is greater than the second preset threshold, it is determined that the deactive playing condition is satisfied.

In this embodiment, the M decoded audio signal frames are continuously received, the energy values of the plurality of sampling signals of each audio signal frame are obtained, the average power of each audio signal frame is determined based on the energy values of the plurality of sampling signals of each audio signal frame, it is determined whether the deactive playing condition is satisfied, and if the deactive playing condition is satisfied, the audio playing program is triggered to enter the deactive playing state, where in the deactive playing state, the audio playing program pauses playing. Therefore, mute playing is effectively recognized, and corresponding processing is performed on an audio playing program, to effectively reduce power consumption when a processing manner of a normal mode is used.

In addition, whether the deactive playing condition is satisfied is determined based on the average power of the M audio signal frames, to further improve recognition accuracy of a mute playing scenario.

Figure 4A:
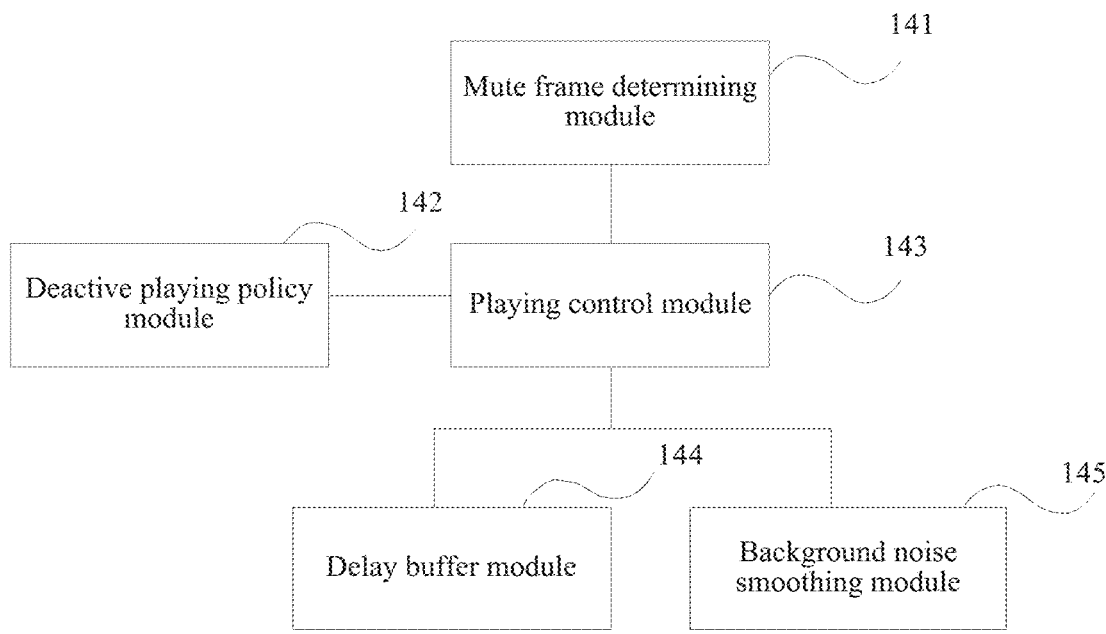
FIG. 4A is a schematic structural diagram of a SID frame power consumption engine 14 according to an embodiment of this application.

FIG. 4A is a schematic structural diagram of a SID frame power consumption engine 14 according to an embodiment of this application. As shown in FIG. 4A, the SID frame power consumption engine 14 may specifically include: a SID frame determining module 141, a deactive playing policy module 142, and a playing control module 143. Optionally, the SID frame power consumption engine 14 may further include a delay buffer module 144 and a background noise smoothing module 145.

It should be noted that division of the modules of the SID frame power consumption engine 14 is logical division, and there may alternatively be another division mode. In this embodiment of this application, the foregoing structure is used as an example for description.

Figure 4B:
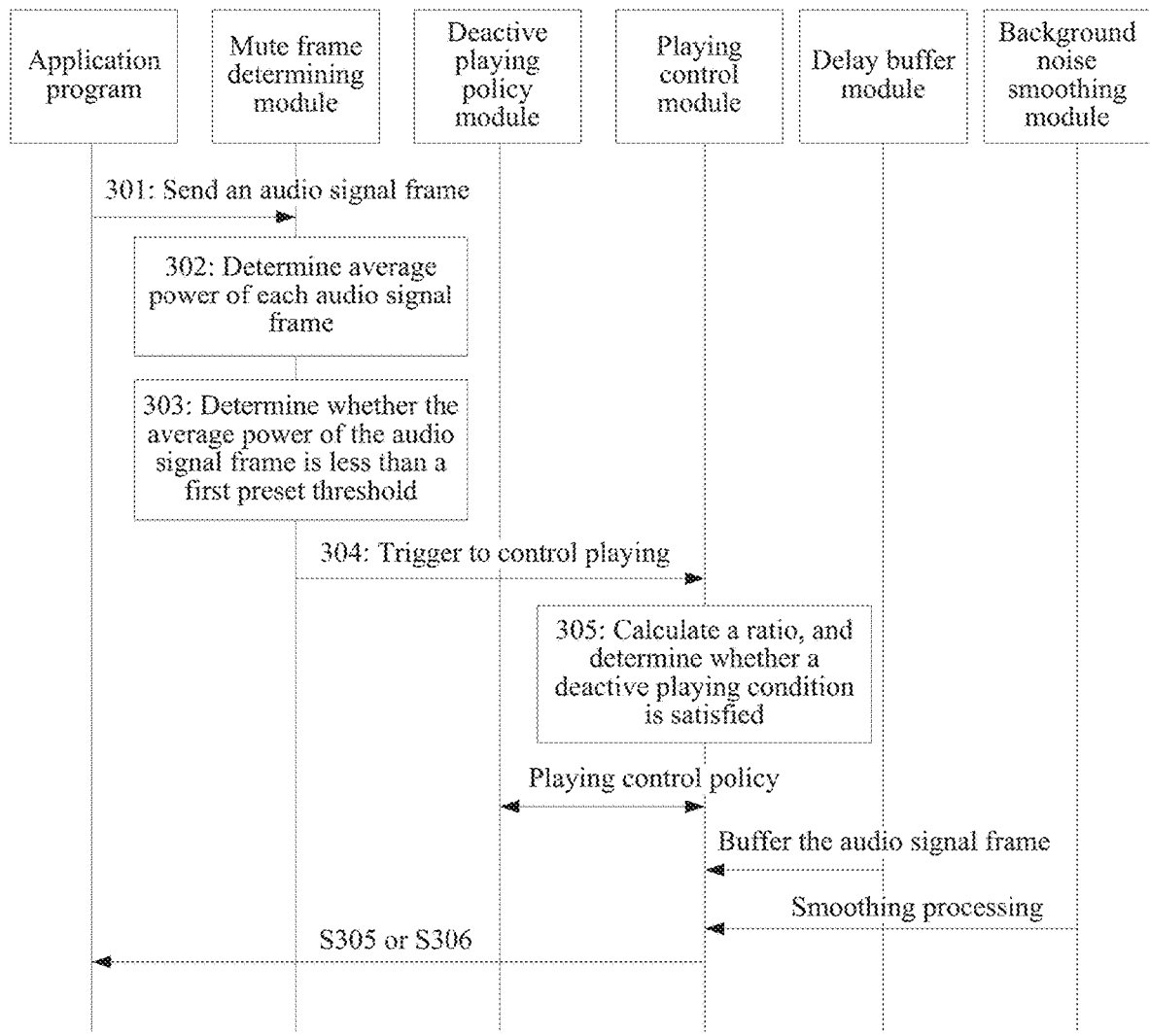
FIG. 4B is a flowchart of another audio data processing method according to an embodiment of this application.
Figure 4C:
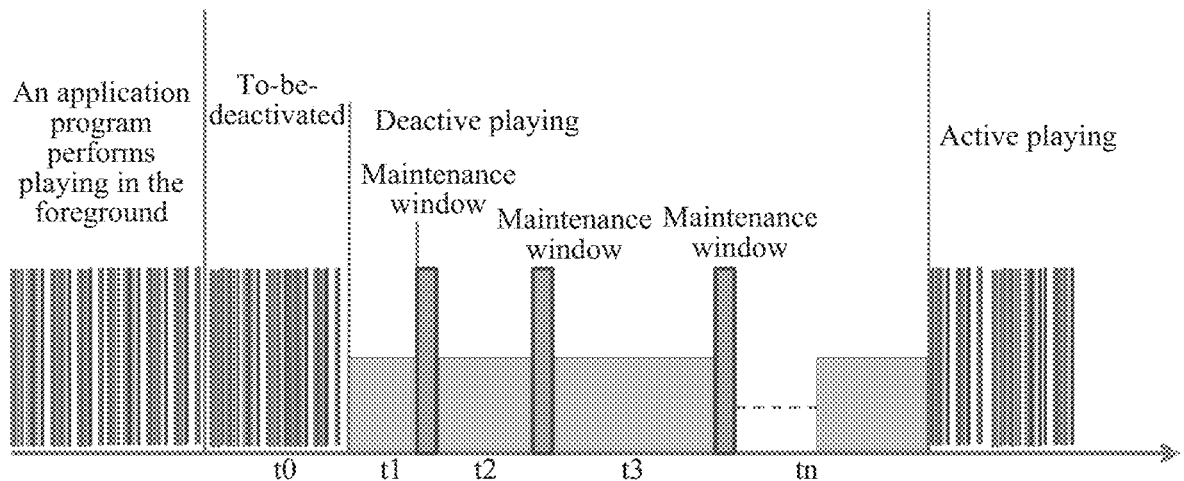
FIG. 4C is a schematic illustrative diagram of a deactive playing mechanism according to an embodiment of this application.

FIG. 4B is a flowchart of another audio data processing method according to an embodiment of this application. FIG. 4C is a schematic illustrative diagram of a deactive playing mechanism according to an embodiment of this application. As shown in FIG. 4B, the method in this embodiment of this application may include the following steps:

S301: An application program sends an audio signal frame to the SID frame determining module 141.

The SID frame determining module 141 receives the audio signal frame sent by the application program.

S302: The SID frame determining module 141 receives the audio signal frame, obtains energy values of a plurality of sampling signals of the audio signal frame, and determines average power of the audio signal frame based on the energy values of the plurality of sampling signals of the audio signal frame.

Specifically, the average power of the audio signal frame may be calculated by using the formula (1).

S303: The SID frame determining module 141 determines whether the average power of the audio signal frame is less than a first preset threshold. If yes, perform S304; or if no, perform S302.

S304: The SID frame determining module 141 triggers the playing control module 143 to control playing.

Specifically, the SID frame determining module 141 may send a determining result in S303 to the playing control module 143.

S305: The playing control module 143 calculates a ratio of audio signal frames that are of M audio signal frames and whose average power is less than the first preset threshold to the M audio signal frames, and determines whether a deactive playing condition is satisfied; and if yes, perform S306; or if no, perform S307.

Specifically, the playing control module 143 continuously receives SID frame determining results sent by the SID frame determining module 141, that is, average power of a plurality of continuous audio signal frames is less than the first preset threshold, and the playing control module 143 may calculate the ratio. Whether the deactive playing condition is satisfied may be determined in the following specific implementation: determining whether the ratio exceeds a second preset threshold, and whether the application program is in a background running mode; and if yes, the deactive playing condition is satisfied. The playing control module 143 may send a determining result that the deactive playing condition is satisfied to the deactive playing policy module 142, and the deactive playing policy module 142 returns a specific playing control policy to the playing control module 143. For example, the application program is controlled to enter a deactive playing state.

S306: The playing control module 143 triggers an application program to enter a deactive playing state.

FIG. 4C is used as an example for illustrative description. In FIG. 4C, a lateral axis is a time axis, and a longitudinal axis is used to indicate an energy value of a sampling signal. As shown on the left in FIG. 4C, before entering the deactive playing state, the application program runs in the foreground. When the application program runs in the background, and the SID frame determining module 141 recognizes that average power of an audio signal frame is less than the first preset threshold, the playing control module 143 may mark that the application program enters a to-be-deactivated playing state. In the to-be-deactivated playing state, the application program normally plays an audio signal frame. When the playing control module 143 continuously obtains from the SID frame determining module 141 that average power of a plurality of audio signal frames is less than the first preset threshold, and a ratio of the audio signal frames whose power is less than the first preset threshold exceeds the second preset threshold, the playing control module 143 may mark that the application program enters the deactive playing state, and trigger the audio playing program to enter the deactive playing state. As shown in FIG. 4C, in the deactive playing state, playing of an audio signal frame is suspended.

Optionally, a deactive playing maintenance window may be further provided. The deactive playing maintenance window is used to: after the audio playing program is triggered to enter the deactive playing state, obtain a decoded audio signal frame of a corresponding time point from the audio playing program at preset intervals, determine whether the deactive playing condition is satisfied, and if the deactive playing condition is satisfied, increase a time length of the preset interval. As shown in FIG. 4C, the deactive playing state is maintained based on each determining result of the maintenance window, and an interval of the maintenance window is gradually increased. For example, t1=30 ms, t2=2 s, t3=5 min, . . . , and tn=6 h.

S307: The playing control module 143 controls the application program to play an audio signal frame of a corresponding time point.

Optionally, if the application program switches from the deactive playing state to an active playing state, that is, the application program switches from suspending playing to playing, the background noise smoothing module 145 performs smoothing processing on the audio signal frame of the corresponding time point, to obtain a smoothed output signal, and controls the application program to play the smoothed output signal. The delay buffer module 144 is configured to: buffer an audio signal frame, and provide an audio signal frame required in smoothing processing, that is, provide a mute signal s(n) required in a formula (3). To be specific, as shown in FIG. 4C, smoothing processing is performed between the deactive playing state and the active playing state, to ensure desirable audio experience in a switching process.

Smoothing processing may be specifically performed by using the following interpolation function:

$$Sout(n) = \frac{(M - \text{ramp}) \cdot s(n) + \text{ramp} \cdot m(n)}{M}. \quad (3)$$

An original audio signal and a mute signal are respectively m(n) and s(n), and output after the smoothing processing is Sout(n). M is a length of smoothing transition, and ramp is a transition time variable and ranges from 0 to M. Obviously, a switching smooth degree depends on both ramp and M. When ramp=0, Sout(n)=s(n). When ramp=M, Sout(n)=m(n).

On an active side, as a sample value n gradually increases, the original audio signal included in components of the smoothed output signal gradually becomes dominant, and mute components gradually become weak and finally transition to complete original audio components by using the formula (3).

In this embodiment, the M decoded audio signal frames are continuously received, the energy values of the plurality of sampling signals of each audio signal frame are obtained, the average power of each audio signal frame is determined based on the energy values of the plurality of sampling signals of each audio signal frame, it is determined whether the deactive playing condition is satisfied, and if the deactive playing condition is satisfied, the audio playing program is triggered to enter the deactive playing state, where in the deactive playing state, the audio playing program pauses playing. Therefore, mute playing is effectively recognized, and corresponding processing is performed on an audio playing program, to effectively reduce power consumption when a processing manner of a normal mode is used.

In addition, whether the deactive playing condition is satisfied is determined based on the average power of the M audio signal frames, to further improve recognition accuracy of a mute playing scenario.

In addition, audio experience can be effectively improved by performing smoothing processing when the deactive playing state is switched to the active playing state.

The audio data processing apparatus in this embodiment of this application is the SID frame power consumption engine shown in FIG. 1.

Figure 5:
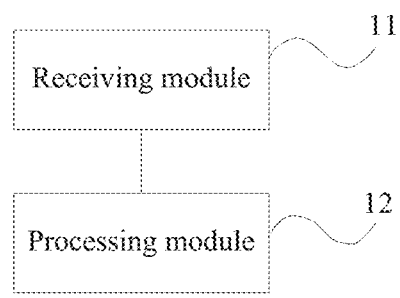
FIG. 5 is a schematic structural diagram of an audio data processing apparatus according to an embodiment of this application.

FIG. 5 is a schematic structural diagram of an audio data processing apparatus according to an embodiment of this application. As shown in FIG. 5, the apparatus in this embodiment may include: a receiving module 11 and a processing module 12. The receiving module 11 is configured to receive at least one decoded audio signal frame. The processing module 12 is configured to obtain average power of the at least one audio signal frame. The processing module 12 is further configured to: determine whether a deactive playing condition is satisfied, and if the deactive playing condition is satisfied, trigger an audio playing program to pause playing. The deactive playing condition includes: the average power of the at least one audio signal frame is less than a first preset threshold, and the audio playing program is in a background running mode.

Optionally, the at least one audio signal frame includes M audio signal frames, and the processing module 12 obtaining average power of the at least one audio signal frame includes: obtaining average power of each audio signal frame. The deactive playing condition includes: a ratio of audio signal frames that are of the M audio signal frames and whose average power is less than the first preset threshold to the M audio signal frames exceeds a second preset threshold, and the audio playing program is in the background running mode, where M is any positive integer greater than 1.

Optionally, that the receiving module 11 is configured to receive at least one decoded audio signal frame includes: receiving the at least one decoded audio signal frame at preset intervals. The processing module 12 is further configured to: if the deactive playing condition is satisfied continuously for a plurality of times, increase a time length of the preset interval.

Optionally, the processing module 12 is further configured to: if the deactive playing condition is not satisfied, trigger the audio playing program to play the audio signal frame.

Optionally, that the processing module 12 is configured to obtain average power of each audio signal frame includes: obtaining sampling values x of a plurality of sampling signals of each audio signal frame; and calculating average power $p_x(m)$ of each audio signal frame based on a formula $$p_x(m) = \frac{1}{S_0} \sum_{i=0}^{S_0-1} x(mS_0 + i)^2,$$

where m is a number of the audio signal frame, and $S_0$ is a quantity of sampling points of the audio signal frame.

Optionally, the processing module 12 is further configured to: if the audio playing program switches from pausing playing to playing, perform smoothing processing on the audio signal frame, to obtain an output signal after the smoothing; and control the audio playing program to play the output signal obtained after the smoothing.

Optionally, the apparatus in this embodiment of this application may further include a storage module. The storage module is configured to store program code and data of the audio data processing apparatus.

The apparatus in this embodiment may be configured to execute the technical solution in the foregoing method embodiment. Their implementation principles and technical effects are similar. Details are not described herein again.

Figure 6:
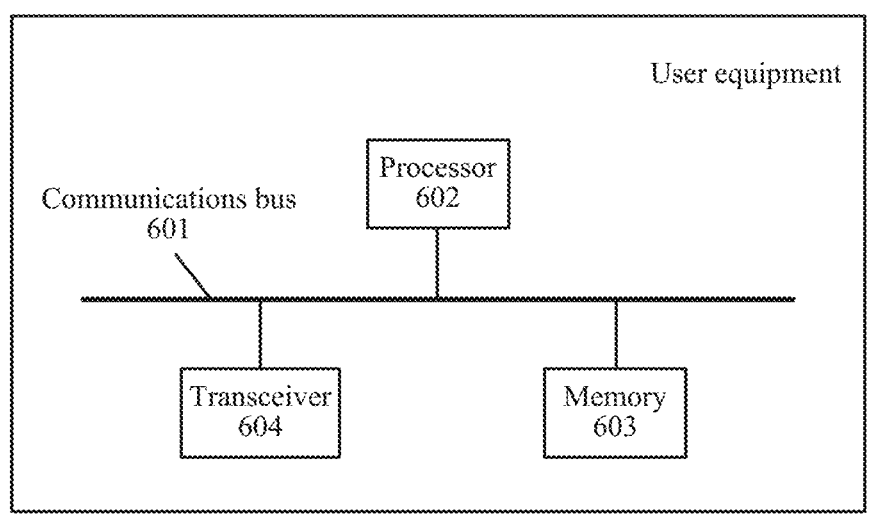
FIG. 6 is a schematic structural diagram of user equipment according to an embodiment of this application.

FIG. 6 is a schematic structural diagram of user equipment according to an embodiment of this application. As shown in FIG. 6, the user equipment in this embodiment may include: a communications bus 601, and at least one processor 602 and a memory 603 connected to the communications bus 601. The communications bus 601 is configured to implement connection and communication between the apparatuses. The processor 602 may be a central processing unit (Central Processing Unit, CPU), an application-specific integrated circuit ASIC (Application-Specific Integrated Circuit, ASIC), one or more integrated circuits implementing the embodiments of this application, or a system on chip (System on Chip, SoC for short). The memory 603 stores one or more programs. The one or more programs include an instruction. When the instruction is executed by the user equipment, the user equipment executes the technical solution in the foregoing method embodiment. Their implementation principles and technical effects are similar. Details are not described herein again.

Optionally, the user equipment in this embodiment may further include a transceiver 604. The processor 602 may invoke instruction code in the memory 603, and control the transceiver 604 in this embodiment of this application to perform the operations in the foregoing method embodiment. Their implementation principles and technical effects are similar. Details are not described herein again.

In an implementation, the receiving module 11 in the embodiments of this application may correspond to the transceiver 604 of the user equipment. The processing module 12 may correspond to the processor 602 of the user equipment.

In an implementation, the transceiver 604 in this embodiment of this application may also be a communications interface.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform a part of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented based on a requirement, that is, an inner structure of an apparatus is divided into different function modules to implement all or part of the functions described above. For a detailed working process of the foregoing apparatus, reference may be made to a corresponding process in the foregoing method embodiments, and details are not further described herein.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. An audio data processing method, comprising:
    receiving at least one audio signal frame from an audio playing program;
    obtaining a first average power of the at least one audio signal frame;
    determining whether the first average power of the at least one audio signal frame is less than a first threshold;
    determining whether the audio playing program is in a background running mode; and
    triggering the audio playing program to pause playing in response to determining that the first average power of the at least one audio signal frame is less than the first threshold and determining that the audio playing program is in the background running mode.

2. The method of claim 1, wherein after triggering the audio playing program to pause playing, the method further comprises:
    sampling a plurality of decoded audio signal frames from the audio playing program based on a sampling level that indicates a frequency of sampling decoded audio signal frames; and
    gradually increasing the sampling level when a second average power of the plurality of decoded audio signal frames is less than the first threshold.

3. The method of claim 2, wherein the method further comprises triggering the audio playing program to resume playing in response to determining that the second average power of the plurality of decoded audio signal frames is less than the first threshold.

4. The method of claim 3, wherein the method further comprises:
    performing smoothing processing on the at least one audio signal frame to obtain at least one output signal for the at least one audio signal frame; and
    controlling the audio playing program to play the at least one output signal.

5. The method of claim 1, wherein the obtaining the first average power of the at least one audio signal frame comprises:
    obtaining sampling values x of a plurality of sampling signals of each audio signal frame of the at least one audio signal frame; and
    calculating an average power $p_x(m)$ of each audio signal frame based on a formula $$p_x(m) = \frac{1}{S_0} \sum_{i=0}^{S_0-1} x(mS_0 + i)^2,$$

wherein m is a number of the audio signal frame, and $S_0$ is a quantity of sampling points of the audio signal frame.

6. The method of claim 1, wherein the at least one audio signal frame comprises M audio signal frames, and wherein the determining whether the average power of the at least one audio signal frame is less than the first threshold comprises:
    obtaining an average power of each audio signal frame of the M audio signal frames; and
    determining whether a ratio of first audio signal frames to the M audio signal frames exceeds a second threshold, wherein the first audio signal frames are signal frames, of the M audio signal frames, whose average power is less than the first threshold, and wherein M is any positive integer greater than one.

7. The method of claim 1, wherein the method is implemented by a frame power consumption engine located between an application layer of the terminal and a hardware drive layer of the terminal.

8. The method of claim 7, wherein the hardware drive layer is a kernel layer.

9. A terminal, comprising:
    at least one processor; and
    a memory coupled to the at least one processor and storing programming instructions that, when executed by the at least one processor, cause the terminal to:
        receive at least one audio signal frame from an audio playing program;
        obtain a first average power of the at least one audio signal frame;
        determine whether the first average power of the at least one audio signal frame is less than a first threshold;
        determine whether the audio playing program is in a background running mode; and
        trigger the audio playing program to pause playing in response to determining that the first average power of the at least one audio signal frame is less than the first threshold and that the audio playing program is in the background running mode.

10. The terminal of claim 9, wherein the memory further stores programming instruction that, when executed by the at least one processor, cause the terminal to:
    sample a plurality of decoded audio signal frames from the audio playing program based on a sampling level that indicates a frequency of sampling decoded audio signal frames; and
    gradually increase the sampling level when a second average power of the plurality of decoded audio signal frames is less than the first threshold.

11. The terminal of claim 10, wherein the memory further stores programming instruction that, when executed by the at least one processor, cause the terminal to trigger the audio playing program to resume playing in response to determining that the second average power of the plurality of decoded audio signal frames is less than the first threshold.

12. The terminal of claim 11, wherein the memory further stores programming instruction that, when executed by the at least one processor, cause the terminal to:
    perform smoothing processing on the at least one audio signal frames to obtain output signals; and control the audio playing program to play the output signals.

13. The terminal of claim 9, wherein the processor is further configured to further obtain the first average power of the at least one audio signal frame by:
obtaining sampling values x of a plurality of sampling signals of each audio signal frame of the at least one audio signal frame; and
calculating average power $p_x(m)$ of each audio signal frame based on a formula $$p_x(m) = \frac{1}{S_0} \sum_{i=0}^{S_0-1} x(mS_0 + i)^2,$$

wherein m is a number of the audio signal frame, and $S_0$ is a quantity of sampling points of the audio signal frame.

14. The terminal of claim 9, wherein the at least one audio signal frame comprises M audio signal frames, and wherein the determining whether the average power of the at least one audio signal frame is less than the first threshold comprises:
obtaining an average power of each audio signal frame of the M audio signal frames; and
determining whether a ratio of first audio signal frames of the M audio signal frames exceeds a second threshold, wherein the first audio signal frames are signal frames, of the M audio signal frames, whose average power is less than the first threshold, and wherein M is any positive integer greater than one.

15. A non-transitory computer-readable storage medium having computer-readable program code stored therein that, when executed by a processor of an apparatus, is configured to cause the apparatus to:
receive at least one audio signal frame from an audio playing program;
obtain a first average power of the at least one audio signal frame;
determine whether the first average power of the at least one audio signal frame is less than a first threshold;
determine whether the audio playing program is in a background running mode; and
trigger the audio playing program to pause playing in response to determining that the first average power of the at least one audio signal frame is less than the first threshold and that the audio playing program is in the background running mode.

16. The non-transitory computer-readable storage medium of claim 15, wherein the computer-readable program code further causes the apparatus to:
sample a plurality of decoded audio signal frames from the audio playing program based on a sampling level that indicates a frequency of sampling decoded audio signal frames; and
gradually increase the sampling level when a second average power of the plurality of decoded audio signal frames is less than the first threshold.

17. The non-transitory computer-readable storage medium of claim 16, wherein the computer-readable program code further causes the apparatus to trigger the audio playing program to resume playing in response to determining that the second average power of the plurality of decoded audio signal frames is less than the first threshold.

18. The non-transitory computer-readable storage medium of claim 17, wherein the computer-readable program code causes the apparatus to:
perform smoothing processing on the at least one audio signal frame to obtain output signal; and
control the audio playing program to play the at least one output signal.

19. The non-transitory computer-readable storage medium of claim 15, wherein the computer-readable program code further causes the apparatus to obtain the first average power of the at least one audio signal frame by causing the apparatus to:
obtain sampling values x of a plurality of sampling signals of each audio signal frame of the at least one audio signal frame; and
calculate average power $p_x(m)$ of each audio signal frame based on a formula $$p_x(m) = \frac{1}{S_0} \sum_{i=0}^{S_0-1} x(mS_0 + i)^2,$$

wherein m is a number of the audio signal frame, and $S_0$ is a quantity of sampling points of the audio signal frame.

20. The non-transitory computer-readable storage medium of claim 15, wherein the at least one audio signal frame comprises M audio signal frames, and wherein the computer-readable program code that causes the apparatus to determine whether the average power of the at least one audio signal frame is less than the first threshold causes the apparatus to:
obtain average power of each audio signal frame of the M audio signal frames; and
determine whether a ratio of first audio signal frames to the M audio signal frames exceeds a second threshold, wherein the first audio signal frames are signal frames, of the M audio signal frames, whose average power is less than the first threshold, and wherein M is any positive integer greater than one.

* * * * *